United States Patent
Mason

(10) Patent No.: US 11,462,011 B2
(45) Date of Patent: Oct. 4, 2022

(54) SYSTEM AND METHOD FOR AUGMENTING CASTED CONTENT WITH AUGMENTED REALITY CONTENT

(71) Applicant: PlayCall, Inc., San Francisco, CA (US)

(72) Inventor: William Bohannon Mason, San Francisco, CA (US)

(73) Assignee: DUMAS HOLDINGS, LLC, Great Falls, VA (US)

(*) Notice: Subject to any disclaimer, the term of this patent is extended or adjusted under 35 U.S.C. 154(b) by 258 days.

(21) Appl. No.: 16/825,004

(22) Filed: Mar. 20, 2020

(65) Prior Publication Data
US 2020/0302175 A1    Sep. 24, 2020

Related U.S. Application Data

(60) Provisional application No. 62/822,277, filed on Mar. 22, 2019.

(51) Int. Cl.
*G06V 20/20* (2022.01)
*H04N 21/431* (2011.01)
(Continued)

(52) U.S. Cl.
CPC .......... *G06V 20/20* (2022.01); *G06T 11/00* (2013.01); *G06V 20/42* (2022.01);
(Continued)

(58) Field of Classification Search
None
See application file for complete search history.

(56) References Cited

U.S. PATENT DOCUMENTS 9,721,394 B2    8/2017  Rosenthal et al.
2017/0347143 A1  11/2017 Limp et al.
(Continued)

FOREIGN PATENT DOCUMENTS

KR    10-2012-0025881 A    3/2012

OTHER PUBLICATIONS

International Search Report and Written Opinion of the International Searching Authority dated Jul. 6, 2020 issued in corresponding International Patent Application No. PCT/US2020/023779 (13 pgs.).

(Continued)

*Primary Examiner* — Nicholas R Wilson
(74) *Attorney, Agent, or Firm* — Pillsbury Winthrop Shaw Pittman, LLP

(57) ABSTRACT

In some embodiments, casted content may be augmented with augmented reality content. In some embodiments, a dynamic value of moment related to a content portion of casted content may be obtained. The dynamic value of moment may be based on characteristic information related to the content portion of the casted content. An augmentation package may be generated, based on the dynamic value of moment, for the content portion. Based on a first entity being associated with the augmentation package, augmented reality content associated with the first entity may be selected to be presented with the content portion. In some embodiments, a modified content portion may be caused to be presented such that the augmented reality content associated with the first entity is presented with the content portion.

22 Claims, 7 Drawing Sheets

(51) Int. Cl.
  *H04N 21/442*   (2011.01)
  *H04N 21/2187*  (2011.01)
  *H04N 21/81*    (2011.01)
  *G06V 20/40*    (2022.01)
  *G06T 11/00*    (2006.01)

(52) U.S. Cl.
  CPC ..... *H04N 21/2187* (2013.01); *H04N 21/4316* (2013.01); *H04N 21/44218* (2013.01); *H04N 21/8146* (2013.01)

(56) References Cited

U.S. PATENT DOCUMENTS

| | | |
|---|---|---|
| 2018/0276479 A1 | 9/2018 | Harris et al. |
| 2019/0082235 A1 | 3/2019 | Accardo et al. |
| 2019/0222776 A1* | 7/2019 | Carter .................. G06V 40/103 |

OTHER PUBLICATIONS

International Preliminary Report on Patentability dated Sep. 28, 2021, issued in corresponding International Patent Application No. PCT/US2020/023779 (7 pgs.).

* cited by examiner

SYSTEM AND METHOD FOR AUGMENTING CASTED CONTENT WITH AUGMENTED REALITY CONTENT

CROSS REFERENCE TO RELATED APPLICATIONS

This application claims priority to U.S. Provisional Patent Application No. 62/822,277, filed Mar. 22, 2019, which is hereby incorporated by reference herein in its entirety.

FIELD OF THE INVENTION

The invention relates to augmenting casted content, for example, with augmented reality content.

BACKGROUND OF THE INVENTION

As media companies continue to move broadcasting from traditional over-the-air or cable broadcasting to the Internet, content service providers are implementing more flexible and scalable solutions to improve the user experience of content presentations. For example, content service providers offer users the ability to watch their sporting events, movies, or shows on-demand on any number of user devices, as well as the option of a subscription to watch older programming content or the option of a higher-price subscription to watch programming content during an original broadcasting or to live stream particular events. Users, however, often have little or no interest in watching the entirety of a sporting event or other types of broadcast content during the original broadcasting or live stream. As an example, many subscribers will periodically watch a game (e.g., near the end of each quarter or half or near the end of the game) to check the scores or in hopes of experiencing excitement that typically occurs around such periodic times, thereby generally missing the real-time experience of many other exciting plays that occurred at other times. These periods of high excitement and viewership create an opportunity for supplemental content, such as augmented reality content, to be presented with the original programming. However, methods of identifying and augmenting these content portions are currently unavailable. These and other drawbacks exist.

SUMMARY OF THE INVENTION

Aspects of the invention relate to methods, apparatuses, and/or systems for facilitating augmenting casted content with augmented reality content.

In some embodiments, a dynamic value of moment related to a content portion of casted content may be obtained. For example, the dynamic value of moment may be based on characteristic information related to the content portion of the casted content. As an example, the value of moment may be an estimate of a current excitement value of the content portion, other indication of current user interest in the content portion, or other score indicative of a value of the current moment with respect to the content portion. In some embodiments, an augmentation package may be generated, based on the dynamic value of moment, for the content portion. An augmentation package may include an opportunity for supplemental content associated with an entity to be presented with the content portion of the casted content. In some embodiments, based on a first entity being associated with the augmentation package, supplemental content associated with the first entity may be selected to be presented with the content portion. In some embodiments, a modified content portion may be caused to be presented such that the supplemental content associated with the first entity is presented with the content portion. For example, the modified content portion may be augmented to include the supplemental content associated with the first entity.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
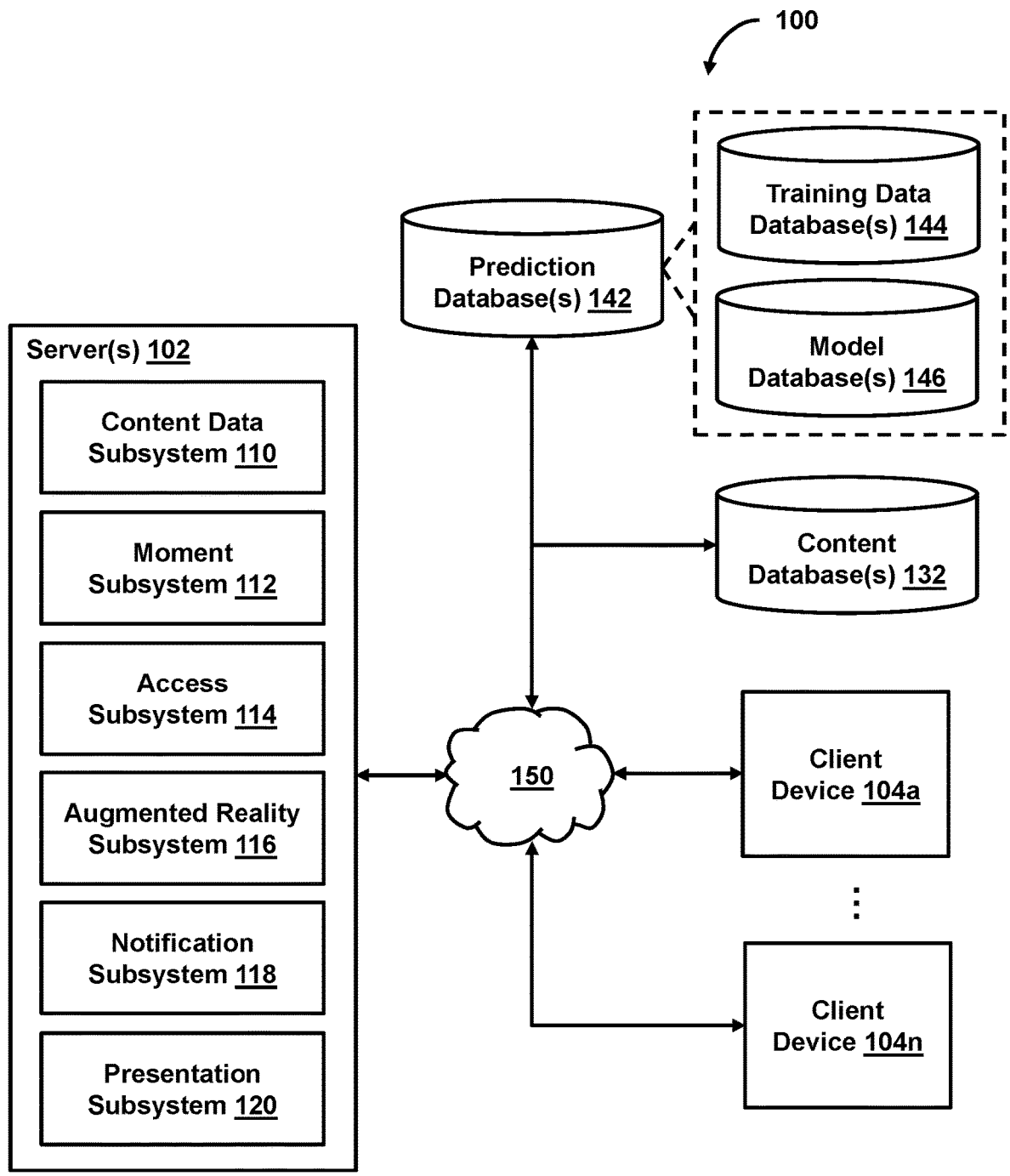
FIG. 1 shows a system for augmenting casted content, in accordance with one or more embodiments.

FIG. 1 shows a system 100 for facilitating augmenting casted content, in accordance with one or more embodiments. As shown in FIG. 1, system 100 may include server(s) 102, client device 104 (or client devices 104a-104n), or other components. Server 102 may include content data subsystem 110, moment subsystem 112, access subsystem 114, augmented reality subsystem 116, notification subsystem 118, presentation subsystem 120, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of server 102, those operations may, in some embodiments, be performed by other components of server 102 or other components of system 100. As an example, while one or more operations are described herein as being performed by components of server 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments). It should also be noted that, although some embodiments are described herein with respect to content (or portions thereof) being broadcasted, the features of such embodiments may be applied to other presented content in other embodiments.

In some embodiments, system 100 may obtain characteristic information related to content being casted and determine one or more scores related to the content based on the characteristic information. As an example, the content may include live broadcast content (e.g., certain live streaming or other live broadcast), content being broadcasted to a geographic region for the first time (e.g., an original broadcast for the geographic region), or other content. System 100 may utilize the scores related to the content to generate a notification related to one or more content portions of the content. As an example, the notification may include a mechanism that enables a user to access the content or the content portions. The mechanism may include (i) a hyperlink to a web page to obtain access to a given content portion (e.g., where the hyperlink includes embedded code to identify to an online service a reference point of the broadcast to start the presentation, where the web page includes embedded code to access the content portion being broadcasted, etc.), (ii) embedded code to obtain access to the content portion (e.g., code for a "Play" button that initiates loading of the presentation of the content portion), or (iii) other mechanisms.

To address one or more issues described above, in some embodiments, system 100 may determine a value of moment (e.g., a value of moment score or other value) related to a content portion (of the content) that is currently being casted and generate a notification related to the content portion based on the value of moment. As an example, the value of moment may be an estimate of a current excitement value of the content portion (e.g., a predetermined period of the casted content, a remaining time left in a game or other event of the casted content, a remaining time left in the predetermined period, etc.), other indication of current user interest in the content portion, or other score indicative of a value of the current moment with respect to the content portion. As indicated above, in some embodiments, the notification may include a mechanism that enables a user to access the content portion being broadcasted. In some embodiments, the notification may be generated based on the value of moment. As an example, the notification may include the value of moment or other information derived from the value of moment (e.g., content access requirements derived based on the value of moment or other derived information). In this way, for example, the notification may indicate to a user (to which the notification is presented) a value of the current moment with respect to the content portion.

In some embodiments, system 100 may provide a notification (e.g., generated based on a value of moment for a content portion) for presentation to a user based on the value of moment satisfying a threshold value of moment. As an example, transmission of a notification to a user device of the user (e.g., a push notification) may be avoided responsive to the value of moment being insufficiently high (e.g., failing to satisfy the threshold value of moment because the updated value of moment is less than the threshold value of moment). On the other hand, if the value of moment is updated (e.g., automatically updated based on additional or modified characteristic information related to a current content portion being broadcasted), and the updated value of moment is sufficiently high (e.g., satisfying the threshold value of moment because the updated value of moment meets or exceeds the threshold value of moment), then the notification may be transmitted to the user device for presentation to the user.

In some embodiments, system 100 may generate an augmentation package based on the value of moment for a content portion. For example, the augmentation package may comprise an opportunity, a value of the opportunity, an offer or request therefor, or other information. In some embodiments, system 100 may provide the augmentation package to one or more entities (e.g., external parties, people, companies, sponsors, teams, audience members, etc.). An entity may become associated with the augmentation package by indicating interest in the augmentation package, purchasing the augmentation package, or otherwise becoming associated. Supplemental content associated with the entity may then be presented with the content portion.

In one use case, it may currently be the beginning of the last quarter of a major game between two teams that a user cares about, and the game may be currently be tied. Based on the foregoing characteristic information (e.g., the two teams, the impact of the game on playoffs, it is currently the start of the last quarter (and a full quarter still remains), tied game, etc.), a dynamic value of moment of 796 (e.g., out of 1000 or other maximum score) may be generated for the broadcast portion reflecting the last quarter of the game (or for some other time period of the last quarter that corresponds to the current "moment"). Responsive to the dynamic value of moment satisfying a threshold value of moment (e.g., 700 or other threshold value), a push notification may be presented on a user's mobile device that informs the user of the current scenario of the game and that displays an access button that enables the user to jump to the current broadcast position in the last quarter of the game. The value of moment for the content portion may additionally be included in an augmentation package for the content portion. A first entity may indicate interest in the augmentation package, and supplemental content associated with the first entity may be presented with the content portion.

In a further use case, the home team goes on a scoring run during the last quarter, resulting in a 10-point deficit for the visiting team with seven minutes left in the game. Based on such characteristics of the current scenario, the dynamic value of moment may be automatically adjusted to 2.54. Because of the lower dynamic value of moment (e.g., failing to satisfy the threshold value of moment), a new push notification may not be presented on the user's mobile device. In some cases, however, the user may nevertheless be able to update the notification window (e.g., by pulling a new notification via the corresponding mobile app) to obtain a new notification that informs the user of the current scenario of the game and displays an access button that enables the user to jump to the current broadcast position. The adjusted value of moment (e.g., 2.54) may be included in another augmentation package for the content portion. A second entity may indicate interest in this augmentation package, and supplemental content associated with the second entity may be presented with the content portion.

As indicated above, in some embodiments, a notification (e.g., generated based on a value of moment for a content portion) may include a mechanism to enable a user to access the content portion being broadcasted. System 100 may cause the content portion to be presented at a user device based on activation of the mechanism via the notification. In some embodiments, based on an entity being associated with an augmentation package for the content portion, an augmented version of the content portion (e.g., including supplemental content associated with the entity) may be presented at the user device. As an example, responsive to activation of the mechanism (e.g., hyperlink, embedded code, etc.), the augmented content portion may automatically be loaded at the user device and begin presentation of the content portion at a time reference corresponding to the beginning of the content portion (e.g., the beginning of a periodic interval period of the casted content) or at a time reference corresponding to a current presentation state of the content portion (e.g., the "live" view, a current position of the content portion at which one or more other users are currently watching via one or more other user devices, etc.).

In some embodiments, system 100 may cause other forms of supplemental content related to the content portion to be presented (e.g., based on activation of the mechanism via the notification, activation of another mechanism that enables the user to access the supplemental content, etc.). In some embodiments, system 100 may cause the supplemental content to be presented at the user device or another user device (e.g., a wearable device, a "second screen" device, etc.). As an example, the supplemental content may be "digital skins" or other content that are activated responsive to one or more automated triggers related to the occurrence of an event, pattern, or other aspect of the casted content.

In some embodiments, one or more prediction models may be used to derive one or more value of moments (e.g., value of moment scores or other values), threshold values, content access requirements, notifications, characteristic information, or other information. In some embodiments, system 100 may provide, to a prediction model, characteristic information related to a content portion (e.g., of a broadcast or other content) that is being broadcasted at a current time, and system 100 may determine a value of moment related to the content portion based on results from the prediction model's processing of the characteristic information. In some embodiments, the prediction model may include one or more neural networks or other machine learning models, and such models may be trained on a collection of historical data or other training data (e.g., large sets of data via social media and recent historical statistics, such as statistics indicating what trended on a social media network after games vs. statistical analysis of the games themselves, or other statistics).

As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 2:
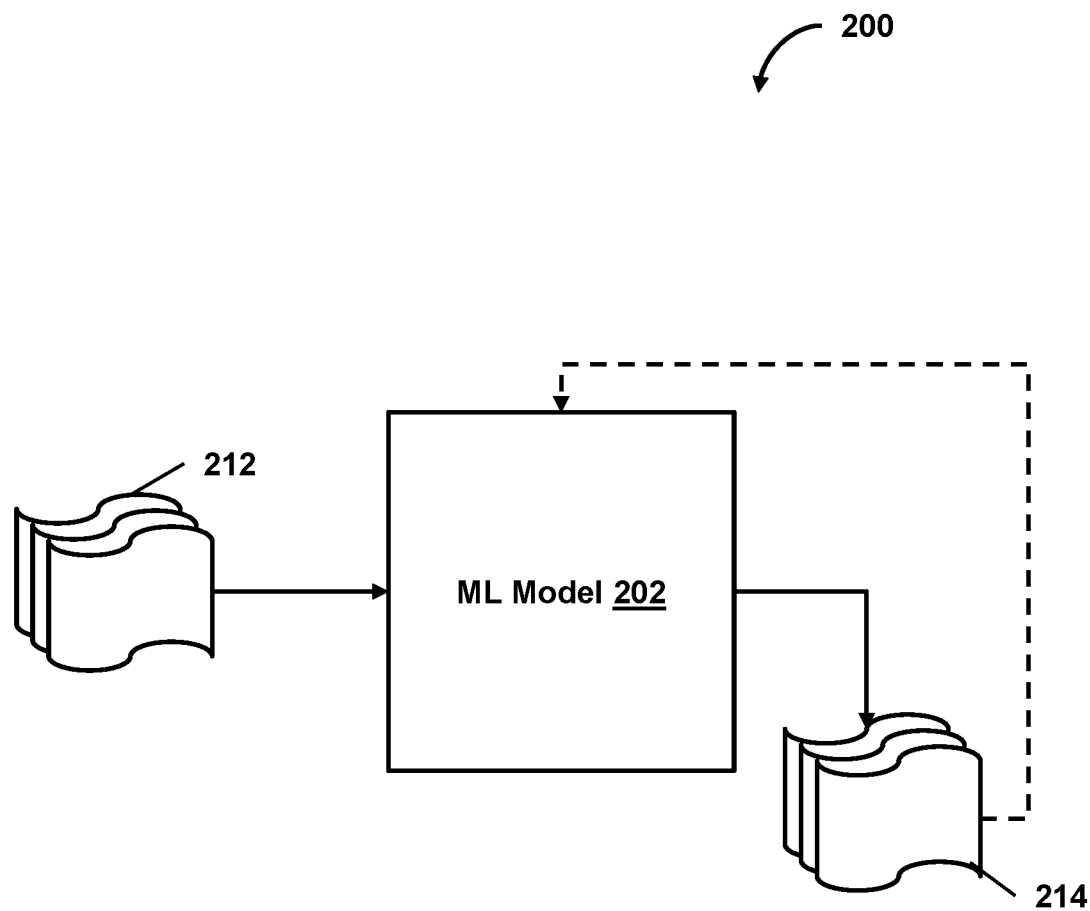
FIG. 2 shows a system implementing a machine learning model to facilitate value of moment scoring and content access requirements, in accordance with one or more embodiments.

As an example, FIG. 2 shows a system 200 implementing a machine learning model 202 to facilitate value of moment scoring and content access requirements, in accordance with one or more embodiments. As shown in FIG. 2, machine learning model 202 may take inputs 212 and provide outputs 214. In one use case, outputs 214 may be fed back to machine learning model 202 as input to train machine learning model 202 (e.g., alone or in conjunction with user indications of the accuracy of outputs 214 or with other reference feedback information). In another use case, machine learning model 202 may update its configurations (e.g., weights, biases, or other parameters) based on its assessment of its prediction (e.g., outputs 214) and reference feedback information (e.g., user indication of accuracy or other information). In another use case, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the prediction model may be trained to generate better predictions.

Subsystems 110-120

In some embodiments, content data subsystem 110 obtain characteristic information related to a content portion (e.g., of a broadcast of an event or other broadcast) that is currently being broadcasted. As an example, the characteristic information may be obtained via one or more data sources prior to or during a time period corresponding to a broadcast of the content. Moment subsystem 112 may use the characteristic information to derive a value of moment for the content portion (or a predetermined sub-portion of the content portion), and notification subsystem 118 may use the characteristic information and the value of moment to generate a notification for presentation to a user. As an example, the characteristic information may include (i) information related to an event being broadcasted (e.g., how close a game is, whether there are players scoring at a highly-above average rate, whether there are statistical records on the line, whether there are historical moments being achieved, such as win streaks or other moments, the records of the teams, team rivalry information, etc.), (ii) popularity analysis related the casted content (e.g., popularity analysis of particular athletes or celebrities involved in the casted content, social graph analysis indicating how much is this particular event trending across social media, etc.), (iii) rating information related to the casted content (e.g., average ratings of the broadcast (historic or real time) or other rating information), (iv) timing information related to the casted content (e.g., time remaining in live broadcast, length of the broadcast in total, etc.), or (v) other information (e.g., pricing of broadcast (such as a la carte pricing, monthly subscription fee, or other third party provider's pricing model), wild card factors like news (such as news indicating that player A has a beef with player B on the other team), etc.).

In some embodiments, moment subsystem 112 may provide characteristic information or other input to a prediction model to derive updated results from the prediction model. As an example, such characteristic information may be provided to the prediction model (i) on a periodic basis (e.g., every second, every minute, every ten minutes, or other time interval), (ii) in accordance with a schedule, or (iii) based on one or more other automated triggers to obtain updated results from the prediction model. In some embodiments, moment subsystem 112 may provide (as input to the prediction model) first characteristic information related to a content portion (e.g., of a broadcast or other content) being broadcasted at a first time and, in response, obtain a value of moment for the content portion being broadcasted at the first time (e.g., from the prediction model). Subsequently, moment subsystem 112 may provide second characteristic information related to the content portion being broadcasted at a second time and obtain an updated value of moment (e.g., reflecting the current value of moment) for the content portion being broadcasted at the second time (e.g., from the prediction model). As a further example, where an initial value of moment may be determined prior to the first time, the value of moment may be updated by the prediction model based on the first characteristic information provided to the prediction model, and the value of moment may be subsequently updated by the prediction model based on the second characteristic score provided to the prediction model.

In some cases, in addition to statistical data, natural language processing may be leveraged to provide sentiment and other analysis to refine the value of moment (e.g., the "big moment" score), and such analytic data may be provided as part of the characteristic information (e.g., provided to the prediction model). The source of this data might be news and blog posts, social media posts, and actual auditory data such as sportscaster commentary, among others. As an example, content data subsystem 110 may perform natural language processing on tweets from fans to uncover what players may be popular on a local level. As another example, content data subsystem 110 may perform natural language processing one or more news sources, social networks, or other sources to determine whether a player was edging close to a statistical milestone that was being socialized. In one scenario, James Harden may be having a scoring streak, or LeBron James may be passing Michael Jordan on the all-time scoring list. As another example, content data subsystem 110 may perform natural language processing on one or more news sources, social networks, or other sources to determine what statistics are "trending" (e.g., is a triple double viewed as a more explosive and important statistical achievement than a 50-point game). In this way, by leveraging machine learning and natural language processing, the value of moment can shift with the dynamic "meta narrative" (e.g., what happens between the games and around them) that permeates every season. The resulting data derived from the natural language processing may, in some cases, also be leveraged to automate the production of questions or predictive opportunities to the end user. For example, by leveraging the extracted data around how a story is told in sports, the generation and distribution of the foregoing questions or predictive opportunities may be automated.

In some embodiments, augmented reality subsystem 116 may identify an opportunity for supplemental content (e.g., augmented reality content) to be presented with the current content portion being broadcasted. For example, an opportunity may be an available space in the current portion. In some embodiments, an available space may be a space which does not include any objects (e.g., people, things, words, etc.), does not include any important objects, includes blank objects or surfaces, or is otherwise available. For example, an available space may be a wall, bus stop, floor, column, shirt, or other space. In some embodiments, an opportunity may be associated with a location (e.g., a location on a map, coordinates, a location marker, or another location). For example, an opportunity may correspond to a location of a user watching the casted content, a location of a product, service, or team, or some other location. In some embodiments, an opportunity may be associated with a person (e.g., a player on a sports team). In some embodiments, an opportunity may be a portion of a display (e.g., a ribbon or banner across a portion of the display).

Figure 4A:
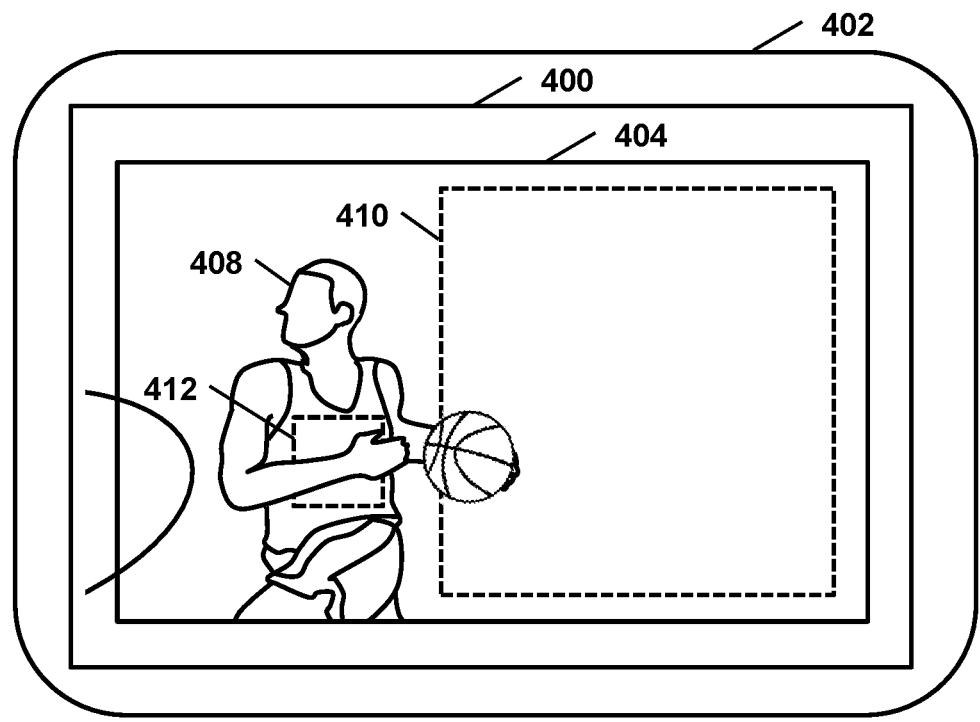
FIGS. 4A-4B show a user interface displaying original content and augmented content, in accordance with one or more embodiments.
Figure 4B:
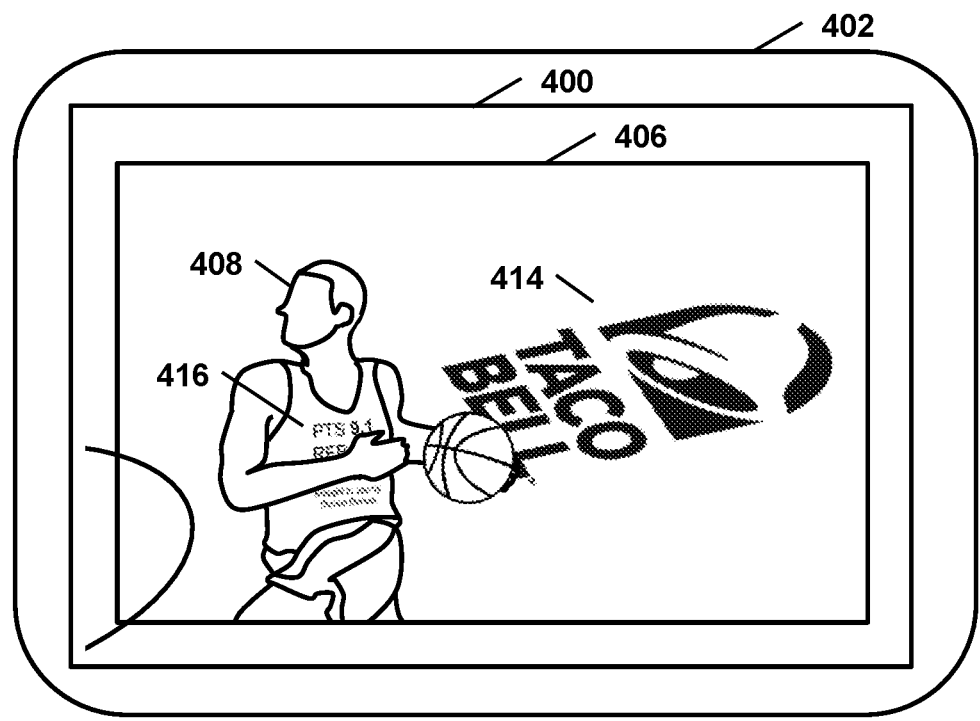

FIGS. 4A-4B show a user interface 400 displaying original content and augmented content, in accordance with one or more embodiments. As shown in FIG. 4A, user interface 400 of mobile device 402 shows original content 404. In some embodiments, original content 404 may be broadcasted or other casted content. In this example, original content 404 is a basketball game. Original content 404 may include any content (e.g., movies, shows, games, programs, or other content) that is casted over a network. Original content 404 currently shows player 408. In some embodiments, augmented reality subsystem 116, as shown in FIG. 1, may identify an opportunity for supplemental content (e.g., augmented reality content) to be presented with original content 404. For example, augmented reality subsystem 116 may identify an available space within original content 404 (e.g., a surface, an empty portion of a display, or some other available space). As shown in FIG. 4A, augmented reality subsystem 116 may identify available space 410, which may be a portion of the floor of the basketball court. Augmented reality subsystem 116 may additionally identify available space 412, which may be a portion of a jersey of player 408.

In some embodiments, server(s) 102 may determine a value associated with the opportunity. In some embodiments, the value may be a price, cost, rating, description, or other measure of value. In some embodiments, the value may depend upon the dynamic value of moment (e.g., as determined by moment subsystem 112). For example, the value may be proportional to the dynamic value of moment. In one example, for a portion of a casted content having a dynamic value of moment of 796 (e.g., out of 1000 or other maximum score), a value of $7.96 cost per mille (CPM) may be determined. In another example, ranges of the dynamic value of moment may be used to determine value. For example, for a portion of a casted content having a dynamic value of moment of 0-2 (e.g., out of 10), a value of low may be determined. For a portion of the broadcast content having a dynamic value of moment of 3-5 (e.g., out of 10), a value of medium-low may be determined, and so on. In some embodiments, the value of moment may be the same as the value of the opportunity. The value of the opportunity may depend on the dynamic value of moment in a number of other ways.

In some embodiments, the value of the opportunity may be based upon other factors, such as size, visibility, readability, time in frame, and other factors. For example, two opportunities available for the same portion of content may be valued differently. As shown in FIG. 4A, available space 410 and available space 412 may both be identified as opportunities. Available space 410 may be associated with a more valuable opportunity, due to the large size and readability. Available space 412 may be associated with a less valuable opportunity, due to the small size and poor readability. The value of available space 412 may be boosted if player 408 is visible in the frame for a large portion of the basketball game. The value of the opportunity may be based upon any combination of the factors discussed herein or other factors.

In some embodiments, the value of the opportunity may be different for different entities. For example, the opportunity may be presented to a first entity at a certain value (e.g., 35 CPM) while the opportunity is presented to a second entity at a different value (e.g., 40 CPM). In some embodiments, the value of the opportunity may be the same for any entity.

In some embodiments, system 100 may generate an augmentation package for the content portion, opportunity, casted content, or other content. For example, the augmentation package may comprise the opportunity, a value of the opportunity, an offer or request therefore, or other information. In some embodiments, system 100 may provide the augmentation package to one or more entities (e.g., external parties, people, companies, sponsors, teams, audience members, etc.). In some embodiments, an entity may become associated with the augmentation package by indicating interest in the augmentation package, purchasing the augmentation package, or otherwise becoming associated. For example, the entity may purchase the augmentation package in order to include an advertisement, message, image, animation, application, or other supplemental content. In some embodiments, the entity may purchase the augmentation package for the current portion of the casted content at the current value. In some embodiments, the entity may purchase the augmentation package for the duration of the casted content. In some embodiments, the entity may purchase the augmentation package for an extended period of time at a variable value (e.g., that is dependent on changes in the dynamic value of moment).

For example, a real-time bidding (RTB) model may be used to make augmentation packages available to interested entities. In some embodiments, an augmentation package may be made available to one or more entities. Any interested entity may bid on the augmentation package, which may include the opportunity to include supplemental content associated with the interested entity with a content portion of casted content. In some embodiments, an initial bid or reserve price for the augmentation package may be set based on the dynamic value of moment for the content portion. In some embodiments, the initial bid or reserve price may be the same as or based on the value of the opportunity. As an example, if the augmentation package includes multiple opportunities, the initial bid or reserve price for the augmentation package may be based on the values of all opportunities included in the augmentation package (e.g., a sum of the values of the opportunities). The interested entity with the highest bid may be awarded the opportunities to include supplemental content associated with the interested entity with a content portion of casted content.

In some embodiments, other models may be used to enable one or more entities to bid on augmentation packages (e.g., including future opportunities). For example, as discussed in further detail below, augmentation packages may be made available for future opportunities based on predicted dynamic values of moment for future content portions. Interested entities may bid, in advance of a presentation of a future content portion, on an augmentation package for the future content portion. In some embodiments, an initial bid or reserve price for the augmentation package may be set based on the predicted dynamic value of moment for the future content portion. In some embodiments, the initial bid or reserve price may be the same as or based on predicted values of one or more opportunities included in the augmentation package. In some embodiments, the interested party with the highest bid may be awarded the future opportunities to include supplemental content associated with the interested entity with the future content portion of the casted content.

In some embodiments, an entity may indicate interest in future augmentation packages (e.g., future opportunities for augmented reality content to be presented with casted content). For example, the entity may indicate interest in any future opportunities having a particular value, a particular dynamic value of moment, particular features (e.g., size, visibility, readability, time in frame, and other factors), or any combination of these features or other features. For example, an entity may indicate interest in any future opportunities having high visibility and a medium-high value. An entity may indicate interest in any future opportunities having a dynamic value of moment above 900. An entity may indicate interest in any future opportunities having a value of $8.50. An entity may narrow down opportunities of interest to a particular broadcast network, channel, type of content (e.g., reality TV shows), time or day, or other criteria. Any other criteria or combination of criteria may be used by external parties to identify future opportunities of interest.

In some embodiments, a dynamic value of moment may be predicted for a casted content or content portion. For example, before a casted content is scheduled to be presented, one or more machine learning models (e.g., such as machine learning model 202, as shown in FIG. 2) may be used to predict one or more dynamic value of moments for the casted content (or a portion of the casted content). For example, if the casted content is a reality television show finale and the ending is easily predictable or has been leaked, the predicted dynamic value of moment may be low. An associated augmentation package may be generated at a low value and may be pre-purchased by an entity at a discounted cost. If the casted content is a highly-anticipated reality television show finale with high viewership and much social media buzz, the predicted dynamic value of moment may be high. An associated augmentation package may be generated at a higher value and may be pre-purchased by an entity at a higher cost. These and other methods of pre-generating augmentation packages may be performed.

In some embodiments, augmented reality subsystem 116 may augment or otherwise modify a portion of the casted content. For example, the casted content may be augmented with supplemental content associated with an entity associated with the augmentation package. As shown in FIG. 4B, augmented content 406 includes augmented reality content 414 and augmented reality content 416. In some embodiments, augmented reality content 414 and augmented reality content 416 may be presented with augmented content 406 such that augmented reality content 414 and augmented reality content 416 are integrated as background objects of the content portion behind one or more foreground objects of the content portion during a presentation of augmented content 406. In some embodiments, augmented reality content 414 and augmented reality content 416 may be displayed on top of, attached to, or as a part of an object of the content portion (e.g., as discussed above). In this example, augmented reality content 414 may be an advertisement (e.g., displayed as if it were on the floor). In this example, augmented reality content 416 may be an informative display and advertisement (e.g., displayed as if it were on the jersey of player 408). Augmented reality content 416 may display statistics for player 408 (e.g., for the season, for the game, or for some other time period) along with a sponsorship. In some embodiments, other augmented reality content may be presented with augmented content 406. For example, a mascot, banner, painting, icon, animation, design, text box, or other content may be presented as augmented reality content.

In some embodiments, augmented reality content 414 or augmented reality content 416 may be presented with augmented content 406 for the current portion of the game (e.g., based on indication of interest, such as a purchase, by the entity). For example, augmented reality content 414 or augmented reality content 416 may be presented until the value associated with the casted content changes, until the dynamic value of moment associated with the casted content changes, or until another event occurs. In some embodiments, augmented reality content 414 or augmented reality content 416 may be presented again, for example, based on interest of the entity in future opportunities and based on criteria discussed above.

In some embodiments, based on a value of moment for a content portion (e.g., of a broadcast or other content), notification subsystem 118 may generate a notification such that the notification includes a mechanism (e.g., hyperlink, embedded code, etc.) to enable a user to access the content portion being broadcasted. Upon detection of the mechanism in the notification being activated, presentation subsystem 120 may cause the content portion to be loaded and presented at a user device of the user (e.g., the user device used to activate the access mechanism or another user device of the user). As an example, presentation subsystem 120 may cause presentation of the content portion to begin at a time reference corresponding to the beginning of the content portion (e.g., the beginning of a periodic interval period of the casted content) or at a time reference corresponding to a current presentation state of the content portion (e.g., the "live" view, a current position of the content portion at which one or more other users are currently watching via one or more other user devices, etc.).

In some embodiments, notification subsystem 118 may generate the notification based on the value of moment. As an example, the notification may include the value of moment, pricing information derived from the value of moment (or other derived content access requirements), or other information. As such, the notification may indicate to a user (to which the notification is presented) a value of the current moment with respect to the content portion. As another example, notification subsystem 118 may generate the access mechanism based on the value of moment and then incorporate the access mechanism in the notification. In one use case, where the access mechanism is a hyperlink, the hyperlink may include the value of moment, a cryptographic encoding of the value of moment (e.g., a hash generated from the value of moment), information derived from the value of moment (e.g., pricing information or other derived content access requirements) or a cryptographic encoding of such derived information (e.g., a hash generated from such derived information). Thus, for example, upon activation of the hyperlink (e.g., by a user clicking, tapping, swiping, or otherwise activating the hyperlink), a web service (or other system) processing the hyperlink may determine its own value of the content portion access or use the value of moment (or its derived information) to set or enforce one or more content access requirements for the user's access of the content portion.

In some embodiments, with respect to a value of moment determined for a content portion (e.g., of a broadcast or other content), notification subsystem 118 may provide a notification for presentation to a user based on the value of moment satisfying a threshold value of moment. As an example, transmission of a notification to a user device of the user (e.g., a push notification) may be avoided responsive to the value of moment being insufficiently high (e.g., failing to satisfy the threshold value of moment because the updated value of moment is less than the threshold value of moment). On the other hand, if the value of moment is updated (e.g., automatically updated based on additional or modified characteristic information related to a current content portion being broadcasted), and the updated value of moment is sufficiently high (e.g., satisfying the threshold value of moment because the updated value of moment meets or exceeds the threshold value of moment), then the notification may be transmitted to the user device for presentation to the user. In some embodiments, the threshold value of moment may be automatically updated (e.g., by a neural network or other prediction model) or updated by the user (e.g., an update initiated by the user indicating the adjustment of the threshold value of moment via a user interface feature).

In some embodiments, with respect to a value of moment determined for a content portion (e.g., of a broadcast or other content), access subsystem 114 may determine access requirement information associated with the content portion based on the value of moment. As an example, the access requirement information may indicate one or more prices associated with the content portion (e.g., an amount of real-world money required for accessing the content portion, an amount of redeemable tokens required for accessing the content portion, a hybrid of such pricing, etc.), actions to be taken to access the content portion (e.g., completion of tasks by the user or other users), other content access requirements, or other information.

In some embodiments, access subsystem 114 may provide the value of moment to a prediction model to obtain the access requirement information associated with the content portion. As an example, in response to providing the value of moment to the prediction model, access subsystem 114 may obtain the access requirement information from the prediction model. As an example, the value of moment may be a dynamic score that is continuously updated (e.g., via a neural network or other prediction model), and the prediction model may continuously provide updated access requirements information associated with the content portion based on the dynamic score. As an example, the dynamic score may be provided to the prediction model (i) on a periodic basis (e.g., every second, every minute, every ten minutes, or other time interval), (ii) in accordance with a schedule, or (iii) based on one or more other automated triggers to obtain updated access requirements information (or other information) from the prediction model.

In some embodiments, notification subsystem 118 may generate a notification based on the access requirement information (e.g., such that the notification includes the access requirement information). As an example, the notification may include an indication of a content access requirement associated with the content portion (e.g., a price associated with the content portion, an action to be taken to access the content portion, a combination of the price and the action, etc.). As another example, the notification may additionally include (i) a mechanism that enables the user to access the content portion being broadcasted, (ii) the value of moment, (iii) a description of the content portion or one or more characteristics from which the value of moment was derived, or (iv) other aspects.

Figure 5A:
FIGS. 5A-5B show a user interface displaying two different notifications that each includes a mechanism to access a content portion of content being presented to a plurality of users, in accordance with one or more embodiments.

In one use case, it may currently be the beginning of the last quarter of a major game between two teams that a user cares about, and the game may be currently be tied. Based on the foregoing characteristic information (e.g., the two teams, the impact of the game on playoffs, it is currently the start of the last quarter (and a full quarter still remains), tied game, etc.), a dynamic value of moment may be generated for the broadcast portion reflecting the last quarter of the game (or for some other time period of the last quarter that corresponds to the current "moment"). As indicated in FIG. 5A, a price of $1.99 to watch the remainder of the game (or to watch another time period that corresponds to the current moment) may be derived from the dynamic value of moment and presented on user interface 500 of mobile device 502 as notification 504. Although the user sees the notification and the price, the user may decide not to purchase access to the game at this point.

The home team then goes on a scoring run during the last quarter, resulting in a 10-point deficit for the visiting team with seven minutes left in the game. Based on such characteristics of the current scenario, the dynamic value of moment may be automatically adjusted (e.g., to a lower score). Based on the current value of moment, a price of $1.27 to watch the remainder of the game (or to watch another time period that corresponds to the current moment) may be derived and made available for presentation to the user (e.g., available for the user to pull an updated notification or otherwise check the dynamic pricing, provided as part of a push notification to the user's mobile device, etc.). Subsequently, the visiting team's all-star player begins to take the game over by himself, scoring twelve straight points in three minutes of game time and bringing his team to a two-point lead over the home team. The dynamic value of moment is automatically adjusted (e.g., to a significantly higher score), and a price of $1.51 to watch the remainder of the game (or to watch another time period that corresponds to the current moment) may be derived and made available for presentation to the user based on the dynamic value of moment.

Figure 5B:

For the next three minutes, the scoring by the two teams continues to go back and forth, and the deficit stays about the same, leading to a tie game with one minute remaining. The dynamic value of moment is automatically adjusted, and a price of $0.99 to watch the remainder of the game may be derived. As an example, with respect to FIG. 5B, an updated notification 506 may be provided on user interface 500 of mobile device 502, and the user may finally decide to jump in and watch the live action (e.g., by activating the "Accept & Play" button 508). The user presses the purchase button within the marketplace platform and is debited the amount. In response, an access token is immediately created for the user, and the corresponding mobile app of the user's device may load and present the broadcasted game (or cause another mobile app to launch and load/present the broadcasted game). In an alternative scenario, where the last minute of the game saw a twenty-point differential, the price to watch the remainder of the game may be wildly different and cheaper (e.g., $0.10 or another price lower than $0.99).

Figure 3:
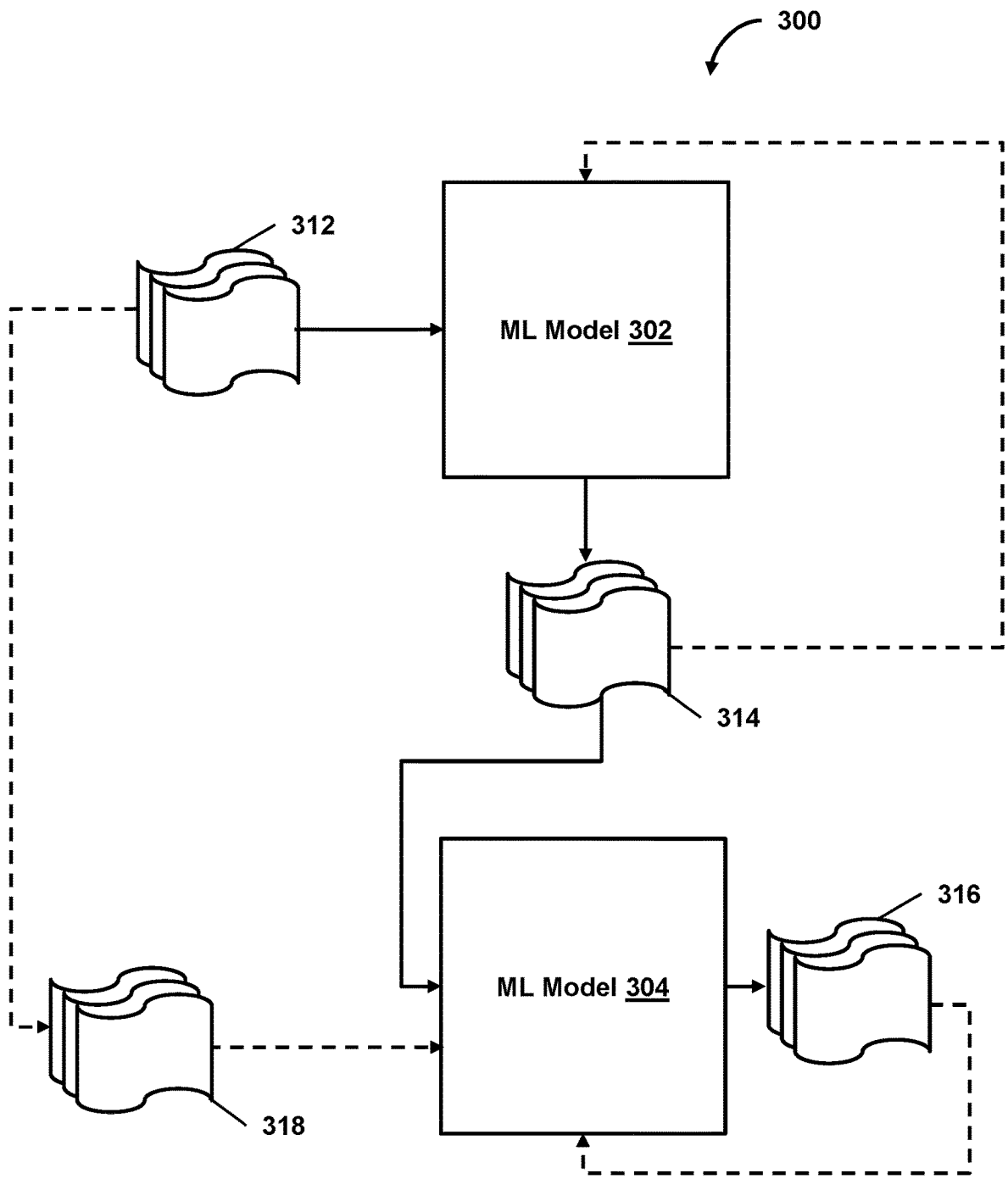
FIG. 3 shows a system implementing two or more machine learning models to facilitate value of moment scoring and content access requirements, in accordance with one or more embodiments.

In some embodiments, with respect to a content portion (e.g., of a broadcast or other content), moment subsystem 112 may provide characteristic information related to the content portion to a first prediction model, and a value of moment derived from the characteristic information may be provided as input to a second prediction model. In response, the second prediction model may provide access requirement information associated with the content portion (e.g., a price associated with the content portion, an action to be taken to access the content portion, a combination of the price and the action, etc.). As an example, FIG. 3 shows a system 300 implementing two or more machine learning models to facilitate value of moment scoring and content access requirements, in accordance with one or more embodiments. As shown in FIG. 3, machine learning model 302 may take inputs 312 (e.g., the characteristic information) and provide outputs 314 (e.g., a value of moment or other score) based on processing of inputs 312. In one use case, outputs 314 may be fed as input into machine learning model 304 (e.g., via a communication link between the two models), and machine learning model 304 may provide inputs 318 (e.g., access requirement information) based on processing of outputs 314 (which are inputs to machine learning model 304). In some cases, inputs 318 (e.g., which may include at least some of inputs 312, such as at least some of the characteristic information) may be provided as input to machine learning model 304, and machine learning model 304 may process outputs 314 and inputs 318 to provide outputs 316.

As another example, outputs 314 may be fed back to machine learning model 302 as input to train machine learning model 302 (e.g., alone or in conjunction with user indications of the accuracy of outputs 314 or with other reference feedback information). As another example, outputs 316 may be fed back to machine learning model 304 as input to train machine learning model 304 (e.g., alone or in conjunction with user indications of the accuracy of outputs 316 or with other reference feedback information). In some use cases, one or more machine learning models 302 or 304 may update their respective configurations (e.g., weights, biases, or other parameters) based on the assessment of their respective predictions (e.g., outputs 314 and 316, respectively) and reference feedback information (e.g., user indication of accuracy or other information). In another use case, where machine learning model 302 or 304 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the prediction model may be trained to generate better predictions.

In some embodiments, with respect to a content portion (e.g., of a broadcast or other content), augmented reality subsystem 116 may cause supplemental content related to the content portion to be included with the content portion.

In some embodiments, where the content portion is presented at a first user device (e.g., responsive to activation of a mechanism provided via a notification, as described herein), presentation subsystem 120 may cause the supplemental content to be presented at the first user device or a second user device (e.g., a wearable device external to the first user device, a "second screen" device external to the first user device, etc.). As an example, the supplemental content may be "digital skins" or other content that are activated responsive to one or more automated triggers related to occurrence of an event, pattern, or other aspect of the casted content. In one scenario, the user might earn exclusive digital content that can be displayed on interactive fashion wearable technology (e.g., "digital skins" or other content presented on flexible LED displays or other screens displays on programmable clothes or other wearables). As an example, if a user is watching a game with the user's favorite team during a big moment (e.g., when the value of moment is high, such as the user's favorite player hitting a three-pointer to win the game), the user may be rewarded with a digital animation that plays on the user's jersey whenever the user's favorite player scores.

In some embodiments, access subsystem 114 may provide tokenized access to live broadcasts or streams (i) as one or more rewards for engagement with one or more services (e.g., watching content on an internal service of server(s) 102 or on a third-party service to obtain such rewards), (ii) as a companion experience to game play (e.g., free or purchasable companion experience provided with a contest or other game play), (iii) as a companion experience to "big moment" gameplay (e.g., free or purchasable companion experience to spur-of-the-moment contests or other game play), or (iv) as standalone purchasable tokens. In some embodiments, based on a user's engagement with one or more services, access subsystem 114 may adjust dynamic pricing or other content access requirements (e.g., by reducing such dynamic pricing or other content access requirements). As an example, greater engagement may lead to greater reductions in dynamic pricing to access content (e.g., content or portions thereof indicated in one or more notifications as described herein).

Examples Flowcharts

Figure 6:
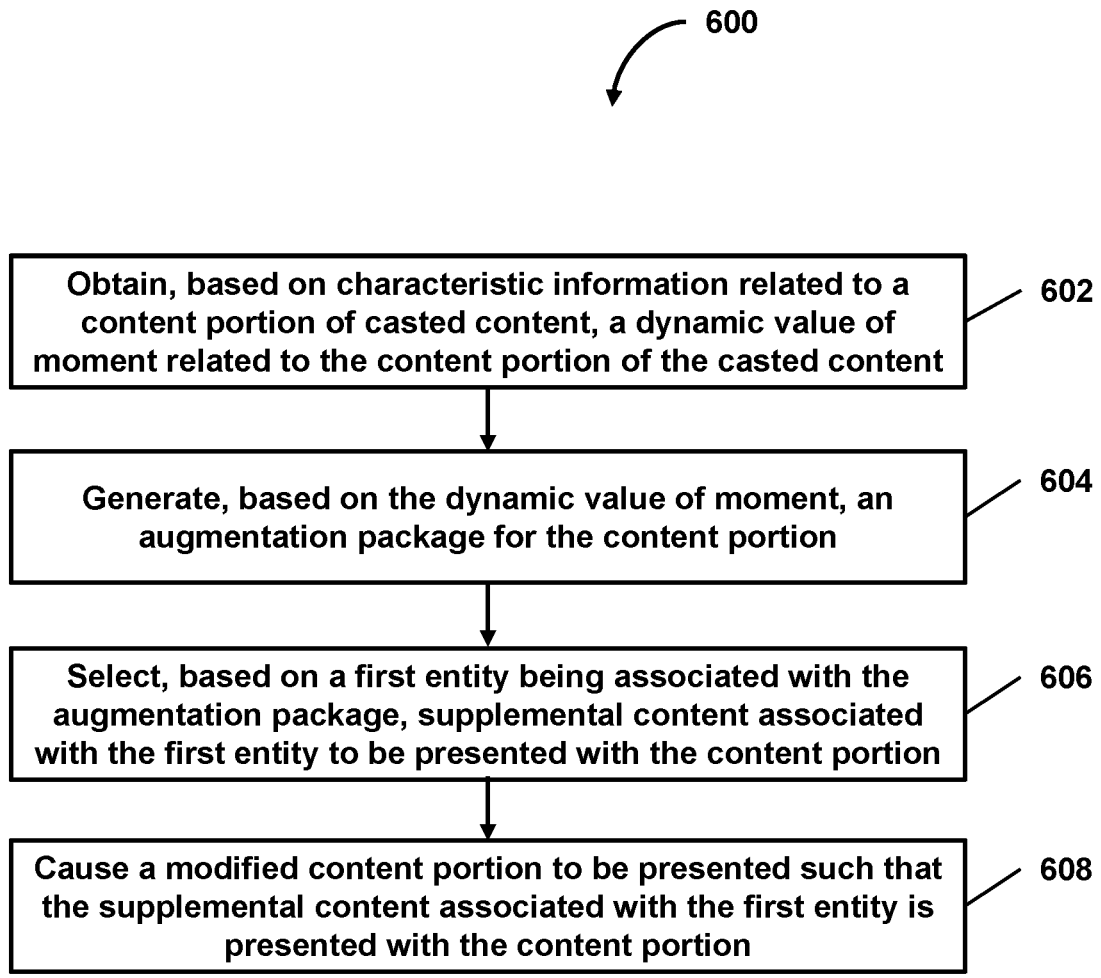
FIG. 6 shows a flowchart of a method for augmenting casted content with augmented reality content, in accordance with one or more embodiments.

FIG. 6 shows a flowchart of a method 600 for augmenting casted content, in accordance with one or more embodiments. The processing operations of the method presented below are intended to be illustrative and non-limiting. In some embodiments, for example, the method may be accomplished with one or more additional operations not described, and/or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

In an operation 602, a dynamic value of moment related to a content portion of casted content may be obtained. In some embodiments, the dynamic value of moment may be based on characteristics information related to the content portion of the casted content. As an example, the characteristic information may include (i) information related to an event being casted, (ii) popularity analysis related the casted content, (iii) rating information related to the casted content, (iv) timing information related to the casted content, or (v) other information. Operation 602 may be performed by a subsystem that is the same as or similar to moment subsystem 112, in accordance with one or more embodiments.

In an operation 604, an augmentation package for the content portion may be generated. In some embodiments, the augmentation package may be generated based on the dynamic value of moment. Operation 604 may be performed by a subsystem that is the same as or similar to augmented reality subsystem 116, in accordance with one or more embodiments.

In an operation 606, supplemental content associated with a first entity may be selected to be presented with the content portion. In some embodiments, the supplemental content may be selected based on the first entity being associated with the augmentation package. Operation 606 may be performed by a subsystem that is the same as or similar to augmented reality subsystem 116, in accordance with one or more embodiments.

In an operation 608, a modified content portion may be caused to be presented such that the supplemental content associated with the first entity is presented with the content portion. For example, in some embodiments, the modified content portion may be augmented with the supplemental content. Operation 608 may be performed by a subsystem that is the same as or similar to augmented reality subsystem 116, in accordance with one or more embodiments.

Figure 7:
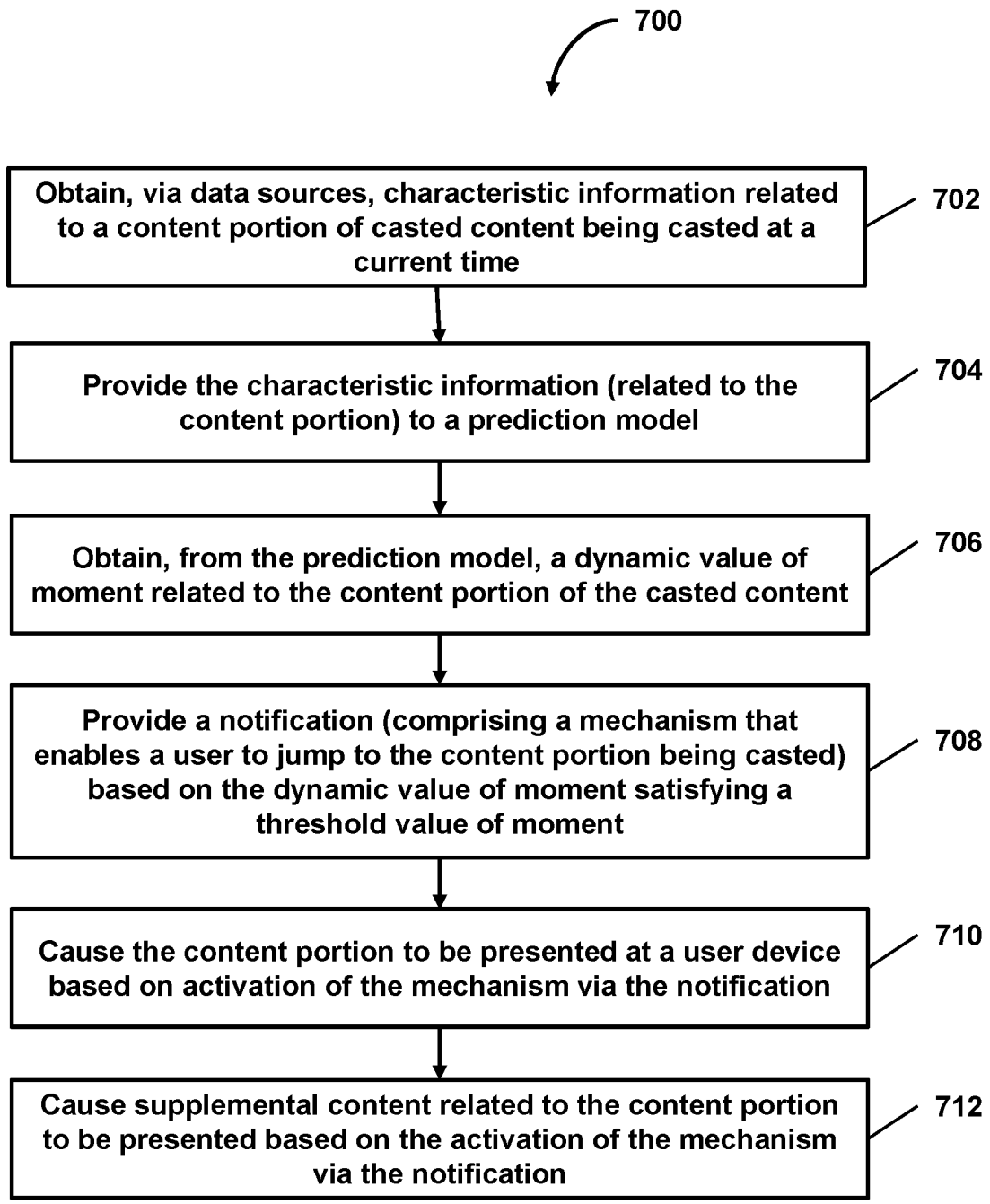
FIG. 7 shows a flowchart of a method of enhancing user experience of content presentation via a dynamic value of moment, in accordance with one or more embodiments.

FIG. 7 shows a flowchart of a method 700 of enhancing user experience of content presentation via a dynamic value of moment, in accordance with one or more embodiments. The processing operations of the method presented below are intended to be illustrative and non-limiting. In some embodiments, for example, the method may be accomplished with one or more additional operations not described, and/or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

In an operation 702, characteristic information related to a content portion (of casted content being casted at a current time) may be obtained via one or more data sources during a time period corresponding to a casting of the casted content. As an example, the characteristic information may include (i) information related to an event being casted, (ii) popularity analysis related the casted content, (iii) rating information related to the casted content, (iv) timing information related to the casted content, or (v) other information. Operation 702 may be performed by a subsystem that is the same as or similar to content data subsystem 110, in accordance with one or more embodiments.

In an operation 704, the characteristic information related to the content portion may be provided to a prediction model. As an example, the characteristic information may be provided to the prediction model (i) on a periodic basis (e.g., every second, every minute, every ten minutes, or other time interval), (ii) in accordance with a schedule, or (iii) based on one or more other automated triggers. Operation 704 may be performed by a subsystem that is the same as or similar to moment subsystem 114, in accordance with one or more embodiments.

In an operation 706, a dynamic value of moment (related to the content portion of the casted content) may be obtained from the prediction model. As an example, the dynamic value of moment may be continuously updated based on characteristic information (e.g., additional or updated information) being provided to the prediction model for the current time. Operation 706 may be performed by a subsystem that is the same as or similar to moment subsystem 114, in accordance with one or more embodiments.

In an operation 708, a notification may be provided (e.g., for presentation to a user) based on the dynamic value of moment satisfying a threshold value of moment. As an example, the notification may include a mechanism that enables a user to jump to the content portion being casted. The mechanism may include (i) a hyperlink to a web page to obtain access to the content portion (e.g., where the hyperlink includes embedded code to identify to an online service a reference point of the casting to start the presentation, where the web page includes embedded code to jump to the content portion being casted, etc.), (ii) embedded code to obtain access to the content portion (e.g., code for a "Play" button that initiates loading of the presentation of the content portion), or (iii) other mechanisms. Operation 708 may be performed by a subsystem that is the same as or similar to notification subsystem 118, in accordance with one or more embodiments.

In an operation 710, the content portion may be presented at a user device based on activation of the mechanism via the notification. As an example, upon activation of a hyperlink in the notification, the corresponding web page may be loaded, and the content portion may automatically be loaded and presented on the web page. Operation 710 may be performed by a subsystem that is the same as or similar to presentation subsystem 120, in accordance with one or more embodiments.

In an operation 712, supplemental content related to the content portion may be presented based on the activation of the mechanism via the notification. As an example, upon activation of a hyperlink or embedded code in the notification, a second screen device may be caused to load an application (e.g., a mobile app, a browser, or other application) that is configured to present the supplemental content (e.g., based on one or more automated triggers related to the content portion being casted). In one use case, the second screen device may include a wearable device having one or more displays or other output devices (e.g., configured to provide audio/visual output, haptic response, etc.). Operation 712 may be performed by a subsystem that is the same as or similar to presentation subsystem 120, in accordance with one or more embodiments.

In some embodiments, the various computers and subsystems illustrated in FIG. 1 may include one or more computing devices that are programmed to perform the functions described herein. The computing devices may include one or more electronic storages (e.g., content database(s) 132, prediction database(s) 142, which may include training data database(s) 144, model database(s) 146, etc., or other electric storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 110-120 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 110-120 described herein is for illustrative purposes, and is not intended to be limiting, as any of subsystems 110-120 may provide more or less functionality than is described. For example, one or more of subsystems 110-120 may be eliminated, and some or all of its functionality may be provided by other ones of subsystems 110-120. As another example, additional subsystems may be programmed to perform some or all of the functionality attributed herein to one of subsystems 110-120.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: obtaining, via data sources, characteristic information related to a content portion of casted content being casted; obtaining, based on the characteristic information, a dynamic value of moment related to the content portion of the casted content; and causing, based on the dynamic value of moment, a version of the content portion of the casted content to be presented to one or more users.

2. The method of embodiment 1, further comprising: generating, based on the dynamic value of moment, an augmentation package for the content portion; and selecting, based on a first entity being associated with the augmentation package, supplemental content associated with the first entity to be presented with the content portion, wherein causing the version of the content portion to be presented comprises causing a modified content portion to be presented such that the supplemental content associated with the first entity is presented with the content portion.

3. The method of embodiment 2, wherein causing the modified content portion to be presented comprises augmenting the content portion to include augmented reality content associated with the first entity.

4. The method of any of embodiments 2-3, further comprising: receiving, from the first entity, an indication of interest in future opportunities for the supplemental content associated with the first entity to be presented with future content portions of the casted content having a particular value of moment; identifying a future opportunity for the supplemental content associated with the first entity to be presented with a future content portion of the casted content having the particular value of moment; and causing the supplemental content associated with the first entity to be presented with the future content portion.

5. The method of any of embodiments 1-4, further comprising: providing, to a first prediction model, first characteristic information related to the content portion being casted at a first time; and providing, to the first prediction model, second characteristic information related to the content portion being casted at a second time.

6. The method of embodiment 5, wherein the dynamic value of moment is updated responsive to the first characteristic information being provided to the first prediction model, and wherein the dynamic value of moment is subsequently updated responsive to the second characteristic information being provided to the first prediction model.

7. The method of any of embodiments 1-4, further comprising periodically providing the characteristic information related to the content portion of the casted content to a first prediction model, and wherein obtaining the dynamic value of moment comprises periodically obtaining the dynamic value of moment related to the content portion of the casted content from the first prediction model.

8. The method of any of embodiments 1-7, further comprising: automatically providing a notification comprising a mechanism that enables a user to jump to the content portion being casted, the notification being provided responsive to the dynamic value of moment satisfying a threshold value of moment; and causing the version of the content portion to be presented at a user device responsive to activation of the mechanism via the notification.

9. The method of embodiment 8, further comprising: providing, to a second prediction model, the dynamic value of moment to obtain access requirement information associated with the content portion, the access requirement information being generated by the second prediction model based on the dynamic value of moment, the access requirement information indicating a content access requirement associated with the content portion, wherein automatically providing the notification comprises automatically generating the notification based on the access requirement information such that the notification comprises (i) an indication of the content access requirement associated with the content portion and (ii) the mechanism that enables the user to jump to the content portion being casted.

10. A tangible, non-transitory, machine-readable medium storing instructions that when executed by a data processing apparatus cause the data processing apparatus to perform operations comprising those of any of embodiments 1-9.

11. A system comprising: one or more processors and memory storing instructions that, when executed by the processors, cause the processors to effectuate operations comprising those of any of embodiments 1-8.

What is claimed is:

1. A system for augmenting casted content with augmented reality content, the system comprising:
   a computer system that comprises one or more processors programmed with computer program instructions that, when executed, cause the computer system to:
   provide, to a neural network, characteristic information related to a content portion of casted content being casted at a current time;
   obtain, from the neural network, a dynamic value of moment related to the content portion of the casted content, the dynamic value of moment being an indication of current user interest in the content portion, the dynamic value of moment being updated responsive to the characteristic information being provided to the neural network for the current time;
   generate, based on the dynamic value of moment, an augmentation package for the content portion;
   select, based on a first entity being associated with the augmentation package, augmented reality content associated with the first entity to be presented with the content portion; and
   augment the content portion with the augmented reality content associated with the first entity such that the augmented reality content is integrated as a background object of the content portion behind one or more foreground objects of the content portion during a presentation of the augmented content portion.

2. The system of claim 1, wherein the characteristic information comprises descriptive information, popularity information, rating information, or timing information.

3. The system of claim 1, wherein the computer system is further caused to:
   provide a notification comprising a mechanism that enables a user to jump to the augmented content portion being casted, the notification being provided responsive to the dynamic value of moment satisfying a threshold value of moment; and cause the augmented content portion to be presented at a user device responsive to activation of the mechanism via the notification.

4. The system of claim 1, wherein a value of the augmentation package is set based on the dynamic value of moment for the content portion.

5. A method being implemented by a computer system that comprises one or more processors executing computer program instructions that, when executed, perform the method, the method comprising:

obtaining, based on characteristic information related to a content portion of casted content, a dynamic value of moment related to the content portion of the casted content, the dynamic value of moment being an indication of current user interest in the content portion;

generating, based on the dynamic value of moment, an augmentation package for the content portion;

selecting, based on a first entity being associated with the augmentation package, supplemental content associated with the first entity to be presented with the content portion; and causing a modified content portion to be presented such that the supplemental content associated with the first entity is presented with the content portion.

6. The method of claim 5, wherein causing the modified content portion to be presented comprises augmenting the content portion to include the supplemental content associated with the first entity.

7. The method of claim 5, further comprising:

providing, to a first neural network, first characteristic information related to the content portion being casted at a first time; and providing, to the first neural network, second characteristic information related to the content portion being casted at a second time.

8. The method of claim 7, wherein the dynamic value of moment is updated responsive to the first characteristic information being provided to the first neural network, and wherein the dynamic value of moment is subsequently updated responsive to the second characteristic information being provided to the first neural network.

9. The method of claim 5, further comprising periodically providing the characteristic information related to the content portion of the casted content, and wherein obtaining the dynamic value of moment comprises periodically obtaining the dynamic value of moment related to the content portion of the casted content.

10. The method of claim 5, further comprising:

providing a notification comprising a mechanism that enables a user to jump to the content portion being casted, the notification being provided responsive to the dynamic value of moment satisfying a threshold value of moment; and causing the content portion to be presented at a user device responsive to activation of the mechanism via the notification.

11. The method of claim 10, further comprising:

providing, to a second neural network, the dynamic value of moment to obtain access requirement information associated with the content portion, the access requirement information being generated by the second neural network based on the dynamic value of moment, the access requirement information indicating a content access requirement associated with the content portion, and wherein providing the notification comprises generating the notification based on the access requirement information such that the notification comprises (i) an indication of the content access requirement associated with the content portion and (ii) the mechanism that enables the user to jump to the content portion being casted.

12. The method of claim 5, further comprising:

receiving, from the first entity, an indication of interest in future content portions of the casted content having a particular value of moment;

identifying a future content portion of the casted content having the particular value of moment; and causing the supplemental content associated with the first entity to be presented with the future content portion.

13. The method of claim 5, wherein a value of the augmentation package is set based on the dynamic value of moment for the content portion.

14. One or more non-transitory computer-readable media comprising instructions that, when executed by one or more processors, cause operations comprising:

obtaining, based on characteristic information related to a content portion of casted content, a dynamic value of moment related to the content portion of the casted content, the dynamic value of moment being an indication of current user interest in the content portion;

generating, based on the dynamic value of moment, an augmentation package for the content portion;

selecting, based on a first entity being associated with the augmentation package, supplemental content associated with the first entity to be presented with the content portion; and causing a modified content portion to be presented such that the supplemental content associated with the first entity is presented with the content portion.

15. The media of claim 14, wherein causing the modified content portion to be presented comprises augmenting the content portion to include the supplemental content associated with the first entity.

16. The media of claim 14, further comprising:

providing, to a first neural network, first characteristic information related to the content portion being casted at a first time; and providing, to the first neural network, second characteristic information related to the content portion being casted at a second time.

17. The media of claim 16, wherein the dynamic value of moment is updated responsive to the first characteristic information being provided to the first neural network, and wherein the dynamic value of moment is subsequently updated responsive to the second characteristic information being provided to the first neural network.

18. The media of claim 14, further comprising periodically providing the characteristic information related to the content portion of the casted content, and wherein obtaining the dynamic value of moment comprises periodically obtaining the dynamic value of moment related to the content portion of the casted content.

19. The media of claim 14, further comprising:

providing a notification comprising a mechanism that enables a user to jump to the content portion being casted, the notification being provided responsive to the dynamic value of moment satisfying a threshold value of moment; and causing the content portion to be presented at a user device responsive to activation of the mechanism via the notification.

20. The media of claim 19, further comprising:

providing, to a second neural network, the dynamic value of moment to obtain access requirement information associated with the content portion, the access requirement information being generated by the second neural network based on the dynamic value of moment, the access requirement information indicating a content access requirement associated with the content portion, and wherein providing the notification comprises generating the notification based on the access requirement information such that the notification comprises (i) an indication of the content access requirement associated with the content portion and (ii) the mechanism that enables the user to jump to the content portion being casted.

21. The media of claim 14, further comprising:

receiving, from the first entity, an indication of interest in future content portions of the casted content having a particular value of moment;

identifying a future content portion of the casted content having the particular value of moment; and causing the supplemental content associated with the first entity to be presented with the future content portion.

22. The media of claim 14, wherein a value of the augmentation package is set based on the dynamic value of moment for the content portion.

* * * * *